United States Patent
Duncan et al.

(10) Patent No.: US 8,555,645 B2
(45) Date of Patent: Oct. 15, 2013

(54) FUEL NOZZLE CENTERBODY AND METHOD OF ASSEMBLING THE SAME

(75) Inventors: Beverly Stephenson Duncan, West Chester, OH (US); Michael Anthony Benjamin, Cincinnati, OH (US); George Chia-Chun Hsiao, West Chester, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1214 days.

(21) Appl. No.: 12/176,898

(22) Filed: Jul. 21, 2008

(65) Prior Publication Data

US 2010/0012750 A1 Jan. 21, 2010

(51) Int. Cl.
*F02C 7/22* (2006.01)
(52) U.S. Cl.
USPC ............................................. 60/737; 60/740
(58) Field of Classification Search
USPC ..................... 60/748, 737, 740, 742, 743
See application file for complete search history.

(56) References Cited

U.S. PATENT DOCUMENTS

| | | | |
|---|---|---|---|
| 5,321,950 A * | 6/1994 | Shekleton et al. | 60/740 |
| 5,826,423 A * | 10/1998 | Lockyer et al. | 60/39.463 |
| 5,908,160 A | 6/1999 | Kramer et al. | |
| 6,141,967 A | 11/2000 | Angel et al. | |
| 6,227,798 B1 | 5/2001 | Demers et al. | |
| 6,389,815 B1 * | 5/2002 | Hura et al. | 60/746 |
| 6,898,938 B2 * | 5/2005 | Mancini et al. | 60/748 |
| 7,007,477 B2 * | 3/2006 | Widener | 60/737 |
| 7,024,861 B2 * | 4/2006 | Martling | 60/737 |
| 7,181,915 B2 | 2/2007 | Ackermann et al. | |
| 2006/0010878 A1 | 1/2006 | Widener | |
| 2007/0074518 A1 * | 4/2007 | Rogers et al. | 60/776 |

FOREIGN PATENT DOCUMENTS

| | | |
|---|---|---|
| EP | 0986717 A1 | 3/2000 |
| EP | 1106787 B1 | 10/2006 |
| EP | 1186832 B1 | 9/2008 |
| JP | 2001152806 A | 6/2001 |
| JP | 2002502489 A | 1/2002 |
| JP | 2002139221 A | 5/2002 |
| WO | 9855800 A1 | 12/1998 |

OTHER PUBLICATIONS

JP Office Action for co-pending JP patent application No. 2009-167339 (1 pg. English language translation; 2 pg Japanese language).

* cited by examiner

*Primary Examiner* — Andrew Nguyen
(74) *Attorney, Agent, or Firm* — Armstrong Teasdale LLP

(57) ABSTRACT

A fuel nozzle centerbody is provided that includes a cylindrical cross-sectional area, and a baffle co-axially aligned within the centerbody. The baffle includes a plurality of circumferentially-spaced apertures configured to channel an airflow radially outward such that the channeled airflow impinges a centerbody inner surface.

14 Claims, 9 Drawing Sheets

US 8,555,645 B2

FUEL NOZZLE CENTERBODY AND METHOD OF ASSEMBLING THE SAME

BACKGROUND OF THE INVENTION

The field of the invention relates generally to gas turbine engines, and more particularly, to cooling combustor components.

At least some known gas turbine engines include a forward fan, a core engine, and a power turbine. The core engine includes at least one compressor that provides pressurized air to a combustor wherein the air is mixed with fuel and ignited for use in generating hot combustion gases. Generated combustion gases flow downstream to one or more turbines that extract energy from the gas to power the compressor and provide useful work, such as powering an aircraft. A turbine section may include a stationary turbine nozzle positioned at the outlet of the combustor for channeling combustion gases into a turbine rotor downstream thereof. At least some known turbine rotors include a plurality of circumferentially-spaced turbine blades that extend radially outward from a rotor disk that rotates about a centerline axis of the engine.

In at least some known combustors, fuel and air are premixed in the fuel nozzle to produce a lean burning flame that reduces $NO_x$ emissions. In some known systems, emissions are further reduced with the use of an airflow system that channels air through swirl vane assemblies and around nested fuel nozzles to reduce internal temperatures. In such systems, a fuel nozzle centerbody channels the air/fuel mixture to the ignition zone for combustion. However, the use of fuel nozzle centerbodies also undesirably increases the potential for autoignition, flashback, or detonation of residual fuel that lingers in areas around the centerbody. More specifically, without adequate cooling of the centerbody structure, the potential of auto-ignition, flashback, or detonation for centerbody walls to over-heat and experience burn-through, or heating of the centerbody structure that may cause local hot-spots that weaken the centerbody walls over time is increased.

BRIEF DESCRIPTION OF THE INVENTION

In one aspect, a fuel nozzle centerbody having a cylindrical cross-sectional area is provided. The centerbody includes an inlet, an outlet, and a centerline axis extending from the inlet to the outlet. The centerbody also includes a baffle substantially co-axially aligned within the centerbody, wherein the baffle includes a plurality of circumferentially-spaced apertures configured to channel airflow radially outward to facilitate impingement cooling of the centerbody.

In another aspect, a method of assembling a fuel nozzle centerbody is provided. The method includes providing a fuel nozzle assembly for a gas turbine engine that includes a mounting flange, wherein the fuel nozzle assembly configured to channel fuel to a combustion zone. The method further includes positioning a baffle upon the mounting flange, wherein the baffle includes an intermediate support configured to form a friction fit with said mounting flange, and coupling an end wall to the fuel nozzle assembly such that an end wall flange supports an baffle first end.

In yet another aspect, a gas turbine engine is provided. The engine includes a fuel nozzle centerbody including a cylindrical cross-section, wherein the centerbody includes a plurality of apertures through a centerbody outer wall. A plurality of apertures are provided that are configured to channel an flow of air radially outward from the centerbody.

Various refinements exist of the features noted in relation to the above-mentioned aspects of the present invention. Additional features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION OF THE INVENTION

Figure 1:
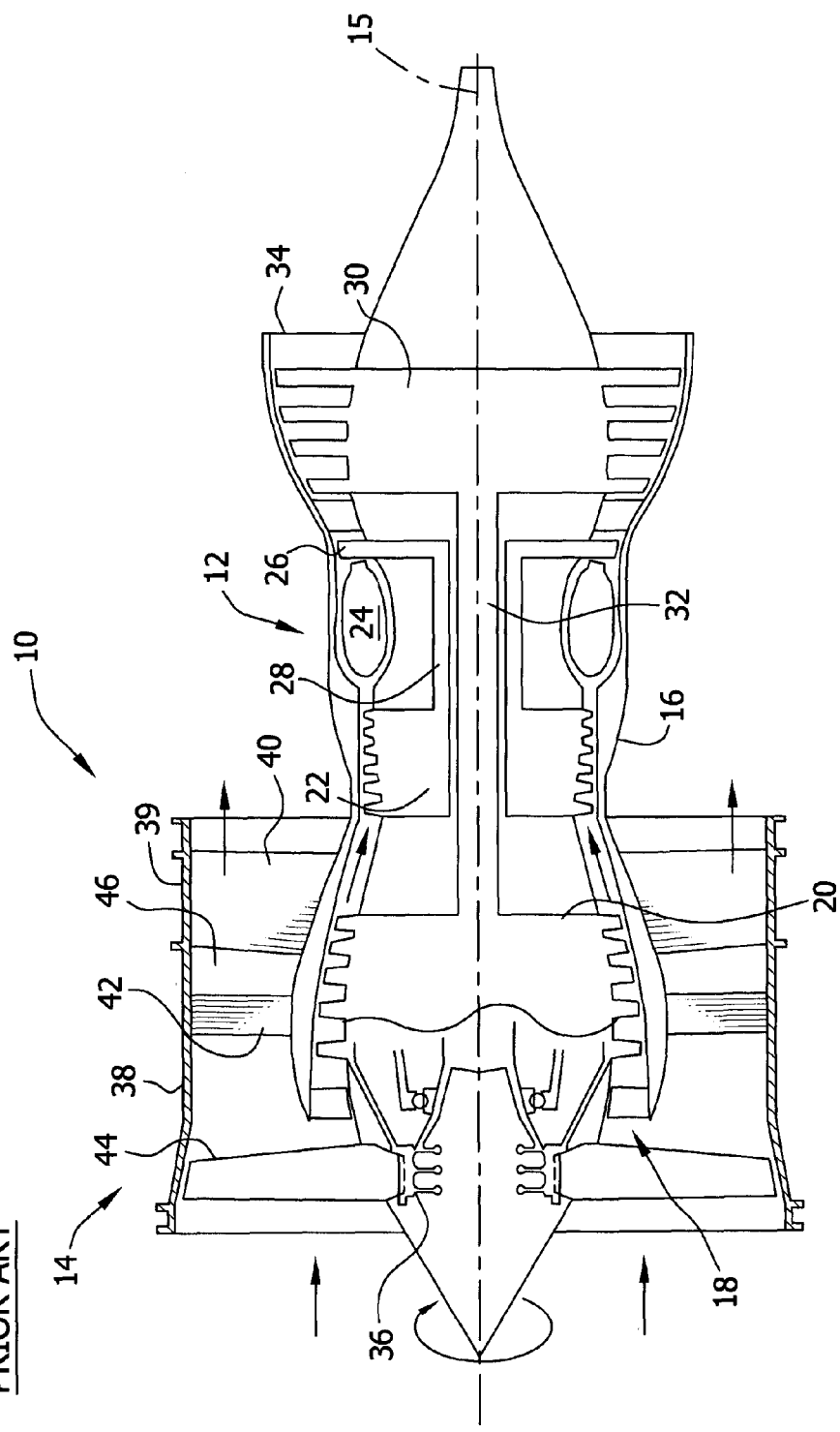
FIG. 1 is a schematic view of an exemplary gas turbine engine.

FIG. 1 is a schematic view of an exemplary gas turbine engine 10 that includes a core engine section 12 positioned axially downstream from a fan section 14 along a longitudinal axis 15. Core engine section 12 includes a generally tubular outer casing 16 that defines an annular core engine inlet 18 and that encloses and supports a pressure booster 20 for use in raising the pressure of the air that enters core engine section 12 to a first pressure level. A high pressure, multi-stage, axial-flow compressor 22 receives pressurized air from booster 20 and further increases the pressure of the air. The pressurized air flows to a combustor 24 where fuel is injected into the pressurized air stream to raise the temperature and energy level of the pressurized air. The high energy combustion products flow to a first turbine 26 for use in driving compressor 22 through a first drive shaft 28, and then to a second turbine 30 for use in driving booster 20 through a second drive shaft 32 that is coaxial with first drive shaft 28. After driving each of turbines 26 and 30, the combustion products are channeled from core engine section 12 through an exhaust nozzle 34 to provide propulsive jet thrust.

Fan section 14 includes a rotatable, axial-flow fan rotor 36 that is surrounded by an annular fan casing 38. Fan casing 38 is supported about core engine section 12 by a plurality of substantially radially-extending, circumferentially-spaced support struts 40. Fan casing 38 is supported by radially-extending outlet guide vanes 42 and encloses fan rotor 36 and a plurality of fan rotor blades 44. Downstream section 39 of fan casing 38 extends over an outer portion of core engine 12 to define a secondary, or bypass, airflow conduit 46 that provides additional propulsive jet thrust.

Figure 2:
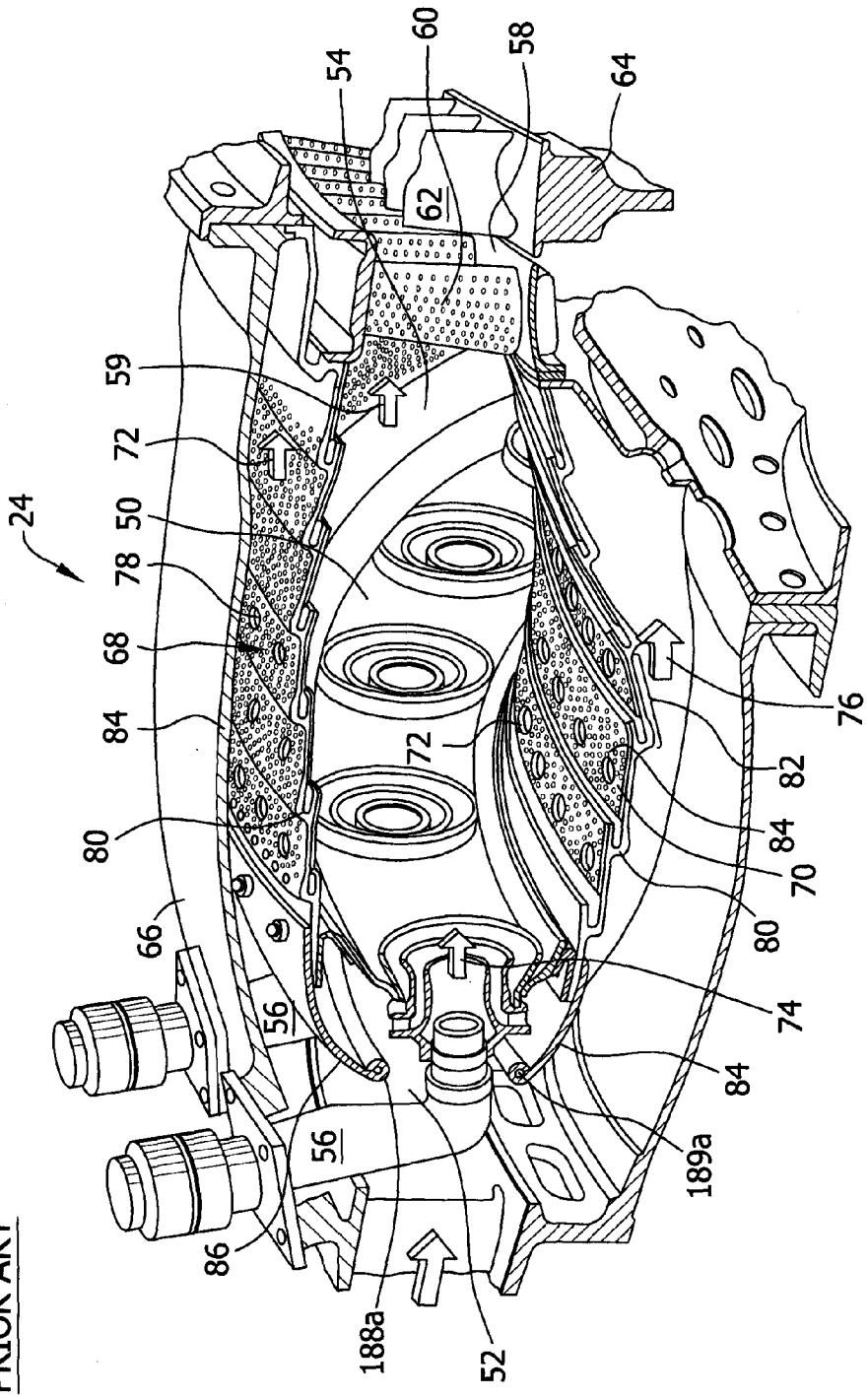
FIG. 2 is an internal perspective view of an exemplary combustor used in the gas turbine engine shown in FIG. 1.

FIG. 2 is an internal perspective view of combustor 24 used in gas turbine engine 10, shown in FIG. 1. In the exemplary embodiment, combustor 24 includes an annular combustion chamber 50 that is aligned substantially coaxially with engine longitudinal axis 15, and an inlet 52 and an outlet 54. Combustor 24 receives a stream of pressurized air discharged from compressor 22 (shown in FIG. 1). A portion of the compressor discharge air flows into combustion chamber 50, wherein fuel injected from a fuel injector assembly 56 is mixed with the air to form a fuel-air mixture for combustion. Ignition of the fuel-air mixture is accomplished by a suitable igniter (not shown) and the resulting combustion gases are discharged towards an annular, first stage turbine inlet 58. Turbine inlet 58 defines an annular flow channel 59 that includes a plurality of circumferentially-spaced stator vanes 60 that channel the gas flow such that the flow impinges upon a plurality of first stage turbine blades 62 that are coupled to a first stage turbine disk 64. First stage turbine 26 rotates compressor 22, and one or more additional downstream stages (not shown) can be provided for driving booster 20 and fan rotor 36, as is shown in FIG. 1.

As shown in FIG. 2, combustion chamber 50 is housed within engine outer casing 66 and is defined by an annular combustor outer liner 68 and a radially-inwardly positioned annular combustor inner liner 70. A portion 72 of airflow channeled therethrough flows over an outermost surface of outer liner 68. A portion 74 of airflow channeled therein is directed into combustion chamber 50, wherein a portion 76 of the airflow is channeled over an innermost surface of inner liner 70.

A plurality of dilution openings 78 are defined within each of outer liner 68 and inner liner 70. Openings 78 enable additional air to enter combustor 24 for completion of the combustion process before the combustion products are channeled towards turbine inlet 58. Additionally, in the exemplary embodiment, outer liner 68 and inner liner 70 include a plurality of annular step portions 80 that are defined by relatively short, inclined, outwardly-flaring annular panels 82 that include a plurality of circularly-spaced cooling air apertures 84 for use in allowing a portion of the air that flows along the outermost surfaces of outer and inner liners 68 and 70, respectively, to flow into the interior of combustion chamber 50.

A plurality of axially-extending fuel injector assemblies 56 are positioned in a circular array at an upstream end of combustor 24 and extend into inlet 52 of annular combustion chamber 50. Upstream portions of outer and inner liners 68 and 70, respectively, are spaced radially from each other and define an outer cowl 86 and an inner cowl 88. The spacing between the forwardmost ends of cowls 86 and 88 define combustion chamber inlet 52 and provides an opening that enables compressor discharge air to enter combustion chamber 50.

Figure 3:
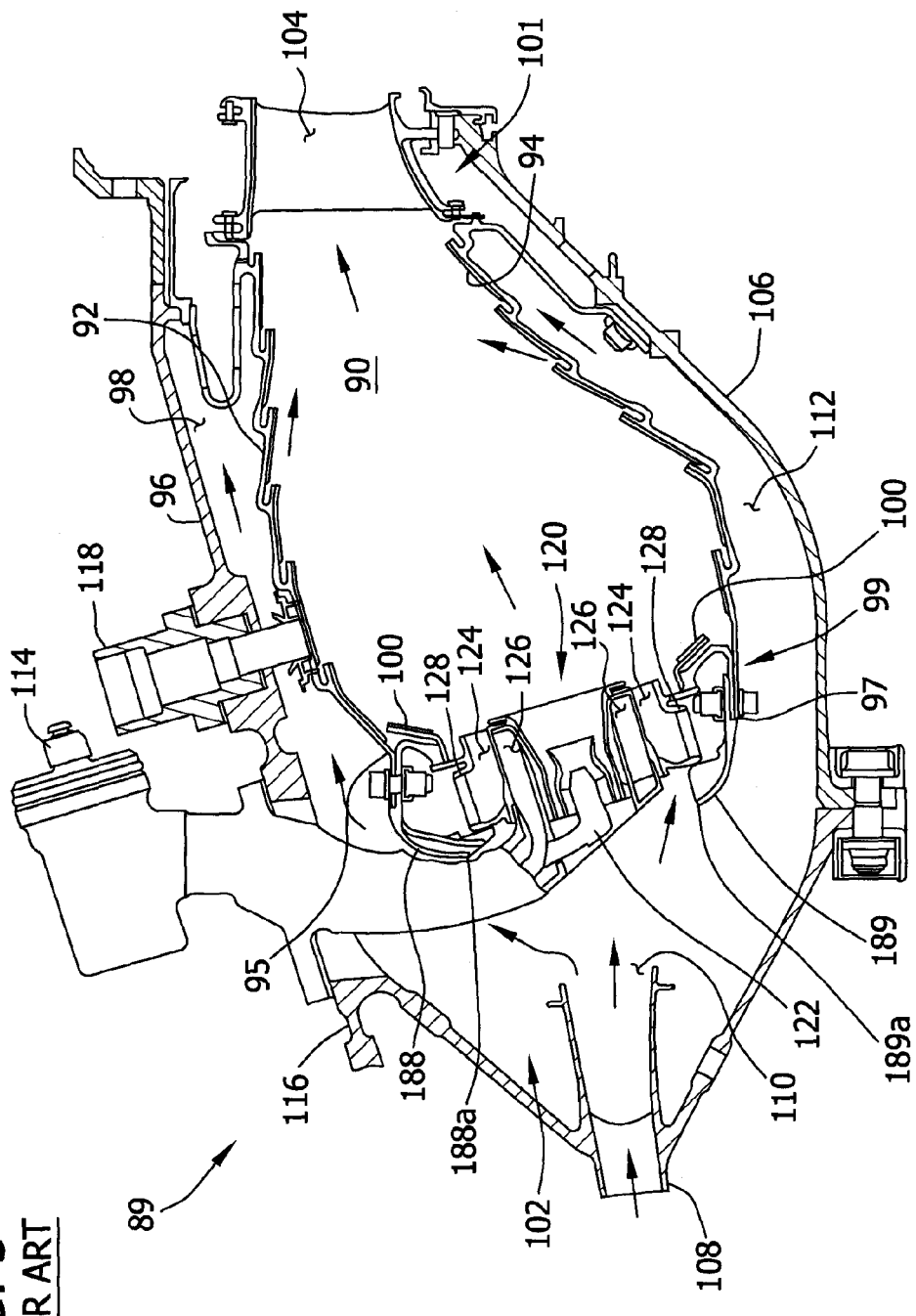
FIG. 3 is a schematic illustration of an exemplary fuel nozzle assembly used with the combustor shown in FIG. 2.

FIG. 3 is an internal side view of an exemplary fuel nozzle assembly 89 used with combustion chamber 50 (shown in FIG. 2). An annular combustion chamber 90 includes an annular combustor outer liner 92 and an annular combustor inner liner 94, and is positioned within an annular engine outer casing 96. Combustion chamber 90 is spaced inwardly from outer casing 96 such that outer liner 92 and outer casing 96 define a flow channel 98 for compressor discharge air to pass therethrough for cooling purposes. An upstream end 99 of combustion chamber 90 includes an annular dome 100 that includes a plurality of air entry holes (not shown) that channel compressor discharge air. Dome 100 extends inwardly and forwardly to a centerbody assembly 102. A cross-sectional area of combustion chamber 90 decreases to a smaller cross-sectional area at its downstream end 101 that is approximately the same size as a cross-sectional area of first stage turbine nozzle 104.

An annular casing 106 is radially inward from inner liner 94 to cause air from compressor 22 (shown in FIG. 1) to flow along combustor inner liner 94 to facilitate shielding other engine internal components, such as the engine drive shaft (not shown), from heat generated within combustion chamber 90.

In the exemplary embodiment, compressor discharge air flows to combustion chamber 90 through an annular duct 108 and into a diffuser section 110 having an enlarged cross-sectional area. Diffuser section 110 is immediately upstream from combustion chamber 90 and is in flow communication with outer flow channel 98, with an inner flow channel 112, and with centerbody assembly 102. In the exemplary embodiment, approximately 60% of the compressor discharge air enters combustion chamber 90 through and around centerbody assembly 102, and the remaining compressor discharge air flows through outer flow channel 98 and through inner flow channel 112 and around combustion chamber 90 for use in cooling other combustor components.

Centerbody assembly 102 is in flow communication with a source of pressurized fuel (not shown) via a fuel inlet 114. Centerbody assembly 102 is coupled to an engine outer casing 116. An igniter 118 is downstream from the centerbody assembly 102 and extends through outer casing 116 and into combustion chamber 90 to provide an initial ignition of the fuel-air mixture within combustion chamber 90. In the exemplary embodiment, centerbody assembly 102 includes a central, primary combustion region 120 for ignition of fuel injected from a primary fuel injector 122, and an annular, secondary combustion region 124 for ignition of fuel injected from an annular, secondary fuel injector 126 that is spaced radially outward from primary fuel injector 122.

In the exemplary embodiment, twelve centerbody assemblies 102 are positioned in a circular array at an inlet 52 of the combustion chamber 90. Alternatively, any number of fuel nozzle assemblies may be positioned within combustion chamber 90 to enable gas turbine engine to function as described herein. Primary fuel injector 122 and secondary fuel injector 126 are received in a respective annular combustor dome 100 that extends from, and is coupled to, each of outer liner 92 and inner liner 94.

An outer cowl 188 extends from a forward edge 95 of outer liner 92. Outer cowl 188 is extends arcuately towards fuel injector 122 and terminates at an outer cowl lip 188a. Similarly, an inner cowl 189 extends forwardly from a forward edge 97 of inner liner 94 and arcuately towards fuel injector 122. Inner cowl 189 terminates at an inner cowl lip 189a. Outer cowl lip 188a and inner cowl lip 189a are spaced radially from each other, relative to engine longitudinal axis 103, such that an annular opening 191 is defined through which compressor discharge air enters combustion chamber 90.

Figure 4:
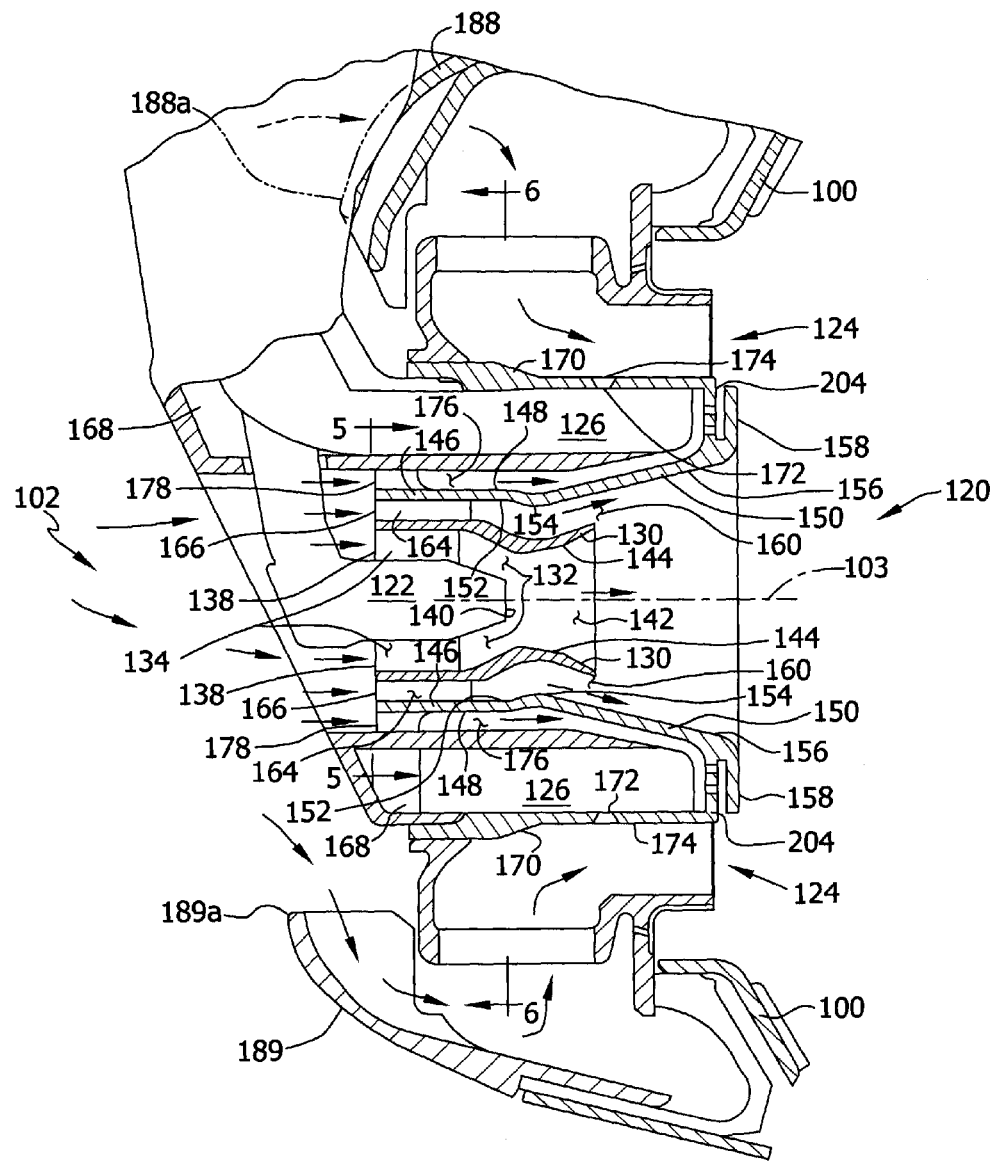
FIG. 4 is a schematic illustration of an exemplary centerbody used with the combustor shown in FIG. 2.
Figure 5:
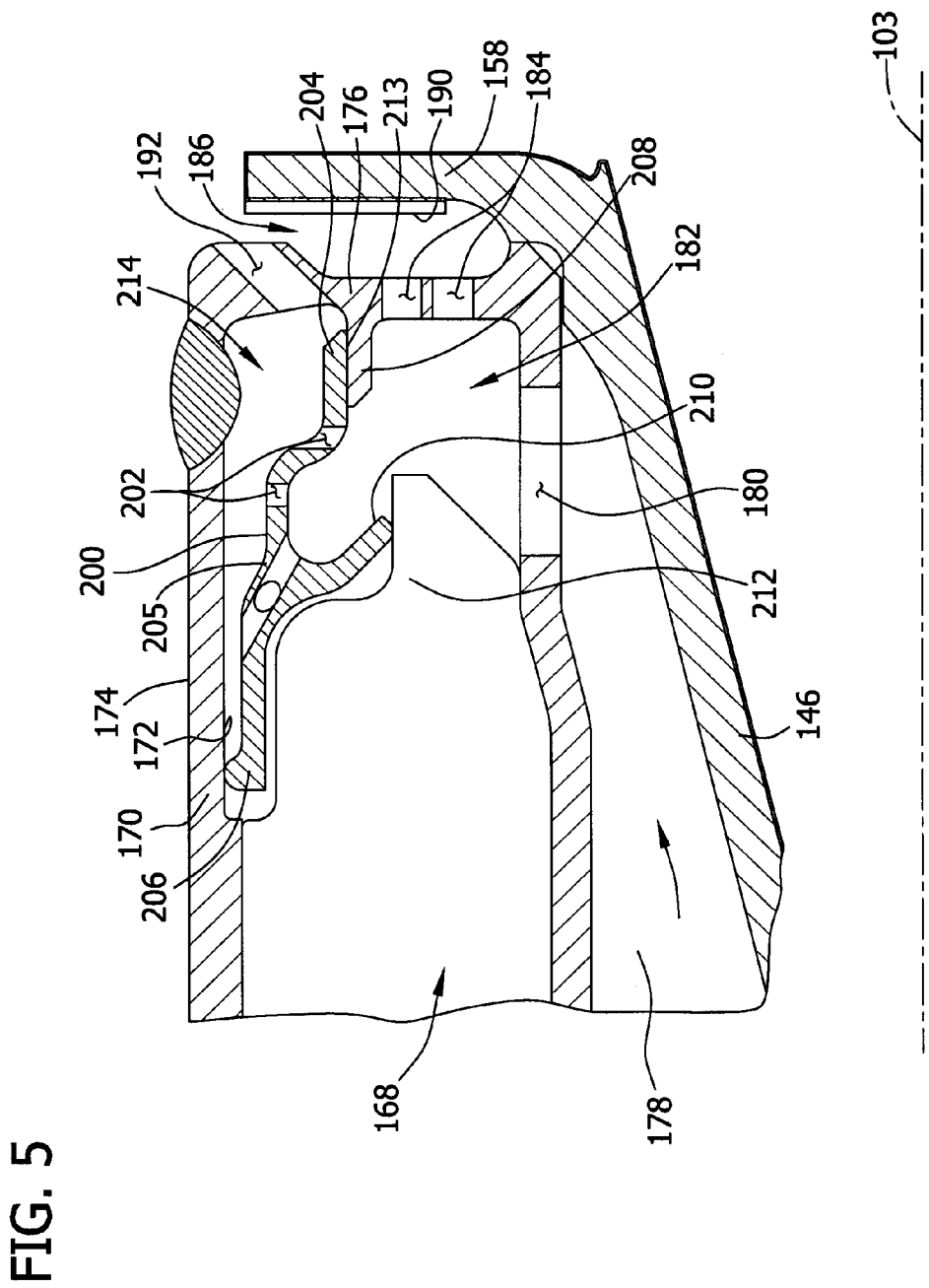
FIG. 5 is a schematic illustration of an exemplary centerbody cooling system used with the centerbody shown in FIG. 4.

FIG. 4 is a schematic illustration of an exemplary centerbody assembly 102 that may be used in combustor 24 shown in FIG. 2, and FIG. 5 is a schematic illustration of centerbody assembly 102. Centerbody assembly 102 is received within combustor dome 100 and is positioned generally axisymmetrically about axis 103. In the exemplary embodiment, centerbody assembly 102 includes a central, primary combustion region 120 and a surrounding, annular, secondary combustion region 124. Primary combustion region 120 includes primary fuel injector 122. Injector 122 is surrounded by a concentrically-aligned, primary annular member 130 such that an inner annular air conduit 132 is defined between member 130 and injector 122. Annular member 130 is radially outward from primary fuel injector 122 and is coupled thereto via a plurality of radially-extending inner swirl vanes 134. Swirl vanes 134 are inclined both radially and axially relative to axis 103 of centerbody assembly 102 to impart rotational movement to the compressor discharge air entering through inlet 138. More specifically, vanes 134 facilitate swirling air in a generally helical manner within conduit 132. Annular member 130 encloses primary fuel injector 122 and channels air around primary fuel injector 122 and through a first diffuser section 142 via an outwardly-flaring wall 144 of injector face 140.

In the exemplary embodiment, a second annular member 146 surrounds and is spaced radially outward from primary annular member 130. Member 146 includes an outer wall 148 and an inner wall 150. Inner wall 150 includes a first axially extending surface 152, an intermediate section 154, and an outwardly-diverging outer section 156 that terminates in a radially outwardly extending flange 158. Inner wall 150 and primary annular member 130 define an outer annular air conduit 160.

Second annular member 146 is coupled to primary annular member 130 via a plurality of radially-extending outer swirl vanes 164 that are inclined both radially and axially relative to fuel nozzle assembly axis 103. Vanes 164 impart a rotational movement to compressor discharge air entering outer conduit 160 through inlet 166. More specifically, vanes 164 facilitate swirling the airflow in a generally helical manner as it flows through conduit 160. In the exemplary embodiment, the rotational direction of the air stream within conduit 160 is the same as the rotational direction of the air stream within conduit 132. Alternatively, the rotational direction of the air streams may be in opposite rotational directions, depending on the fuel nozzle assembly size and configuration, as well as the operating conditions within a particular combustion chamber design.

Annular member 146 defines an inner wall 150 of an annular housing 168 that includes a centerbody outer wall 170. Wall 170 includes an inner surface 172, and an outer surface 174, both of which extend to an end wall 176. In the exemplary embodiment, air is channeled by annular conduit 178 to facilitate cooling inner surface 172. More specifically, and in the exemplary embodiment, air is channeled through a plurality of apertures 180 towards an air distribution region 182. A plurality of axially-extending apertures 184 are defined in end wall 176. In the exemplary embodiment, apertures 184 have approximately the same diameter, and are staggered with respect to each other about end wall 176 such that a substantially uniform flow field is provided within gap 186 for use in cooling flange 158. Alternatively, apertures 184 may be positioned, sized and/or oriented to facilitate cooling centerbody assembly 102 as described herein. More specifically, in the exemplary embodiment, axially-extending apertures 184 are oriented to channel air directly towards an upstream surface 190 of flange 158.

In the exemplary embodiment, a plurality of inclined apertures 192 are defined in end wall 176. Apertures 192 are sized and oriented to channel air downstream and outwardly. More specifically, and in the exemplary embodiment, apertures 192 are oriented outwardly and rearwardly relative to fuel nozzle assembly axis 103 to channel air past flange 158 and towards an innermost portion of secondary combustion region 124 (shown in FIG. 3). In the exemplary embodiment, apertures 192 are oriented relative to axis 103 at an angle of approximately 45°. Alternatively, apertures 192 may be oriented relative to axis 103 at an angle ranging from about 40° to about 50°.

Figure 6:
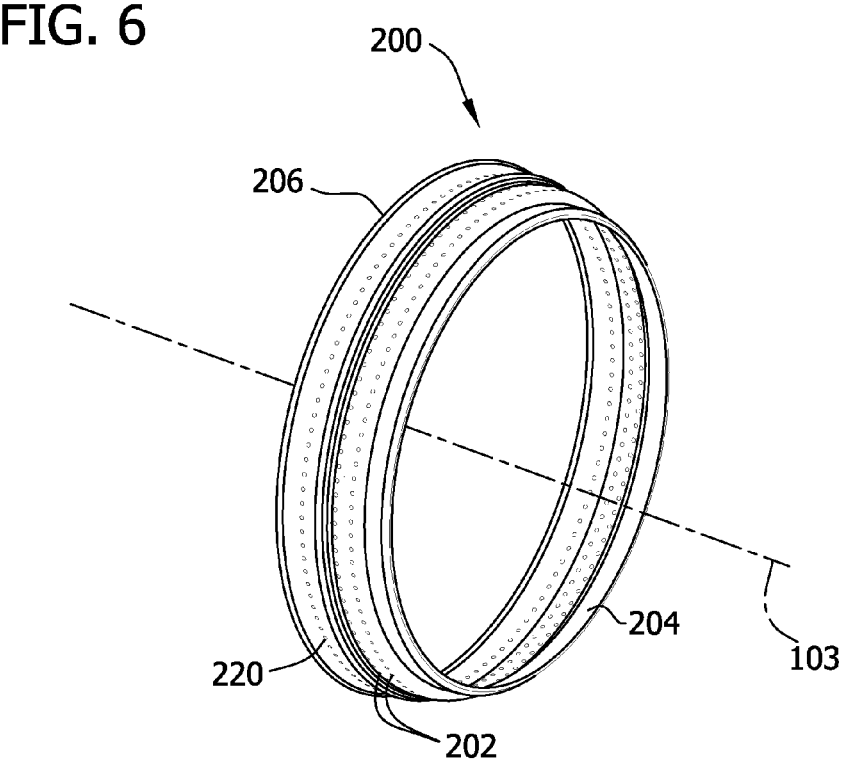
FIG. 6 is a perspective view of an exemplary baffle used with the centerbody cooling system shown in FIG. 5.
Figure 7:
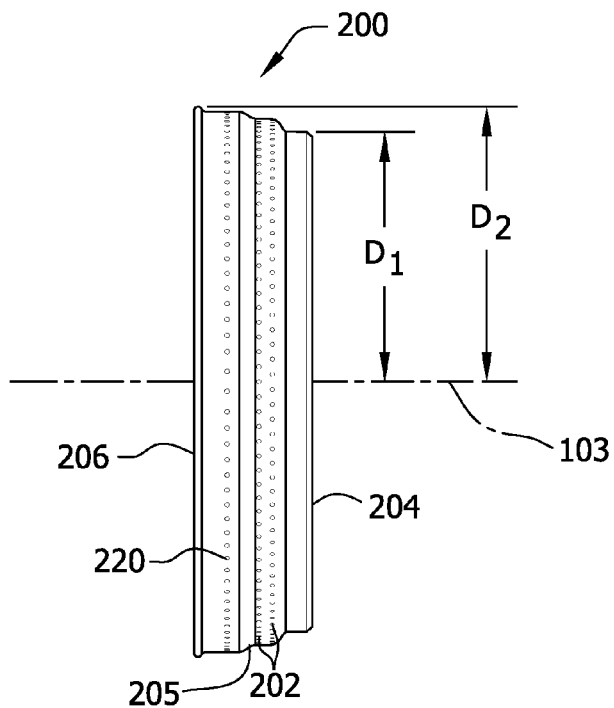
FIG. 7 is a side view of the baffle shown in FIG. 6.

FIG. 6 is a perspective view and FIG. 7 is a side view of a baffle 200 used with centerbody assembly 102 (shown in FIG. 5). In the exemplary embodiment, baffle 200 is substantially arcuate and positioned adjacent to air distribution region 182 and radially inward from centerbody outer wall 170. Baffle 200 includes a plurality of air cooling apertures 202 for use in cooling the inner surface 172 with air channeled from conduit 178. Baffle 200 includes a first end 204 that has a first diameter $D_1$ and that extends from a body portion 205. Baffle 200 also includes an axially-opposite, outwardly-diverging second end 206 that has a second diameter $D_2$. In the exemplary embodiment, first diameter $D_1$ is smaller than second diameter $D_2$. Baffle first end 204 is supported within air distribution region 182 by a flange 208 that extends inwardly from end wall 176 to provide additional support against flange 208 at a mating surface 213. In the exemplary embodiment, mating surface 213 is a friction fit. Alternatively, mating surface 213 may be a bolted joint, a weld joint, and/or any joint arrangement that enables centerbody assembly 102 to function as described herein. Additionally, baffle 200 includes an intermediate support 210 that extends radially inward to provide additional support against an internal support flange 212. In the exemplary embodiment, air cooling apertures 202 have substantially the same diameter $D_1$ (as shown in FIG. 5), and are circumferentially staggered with respect to each other about baffle 200 to provide a substantially uniform flow field within a gap 214 (shown in FIG. 5). Apertures 202 facilitate cooling centerbody outer wall 170 and, more specifically inner surface 172. Alternatively, apertures 202 may be positioned, sized and/or oriented in any configuration that facilitates cooling centerbody assembly as described herein.

Additionally, and in the exemplary embodiment, a second plurality of apertures 220 are defined in baffle 200 and are positioned axially upstream from apertures 202. Apertures 220 are oriented outwardly and forwardly relative to fuel nozzle assembly axis 103 and channel air upstream and in an outward direction. More specifically, apertures 220 are sized and oriented to channel air into gap 214 for use in cooling centerbody outer wall 170 and more specifically inner surface 172, as described herein. Air is channeled from gap 214 via apertures 192, as described in more detail herein.

Figure 8:
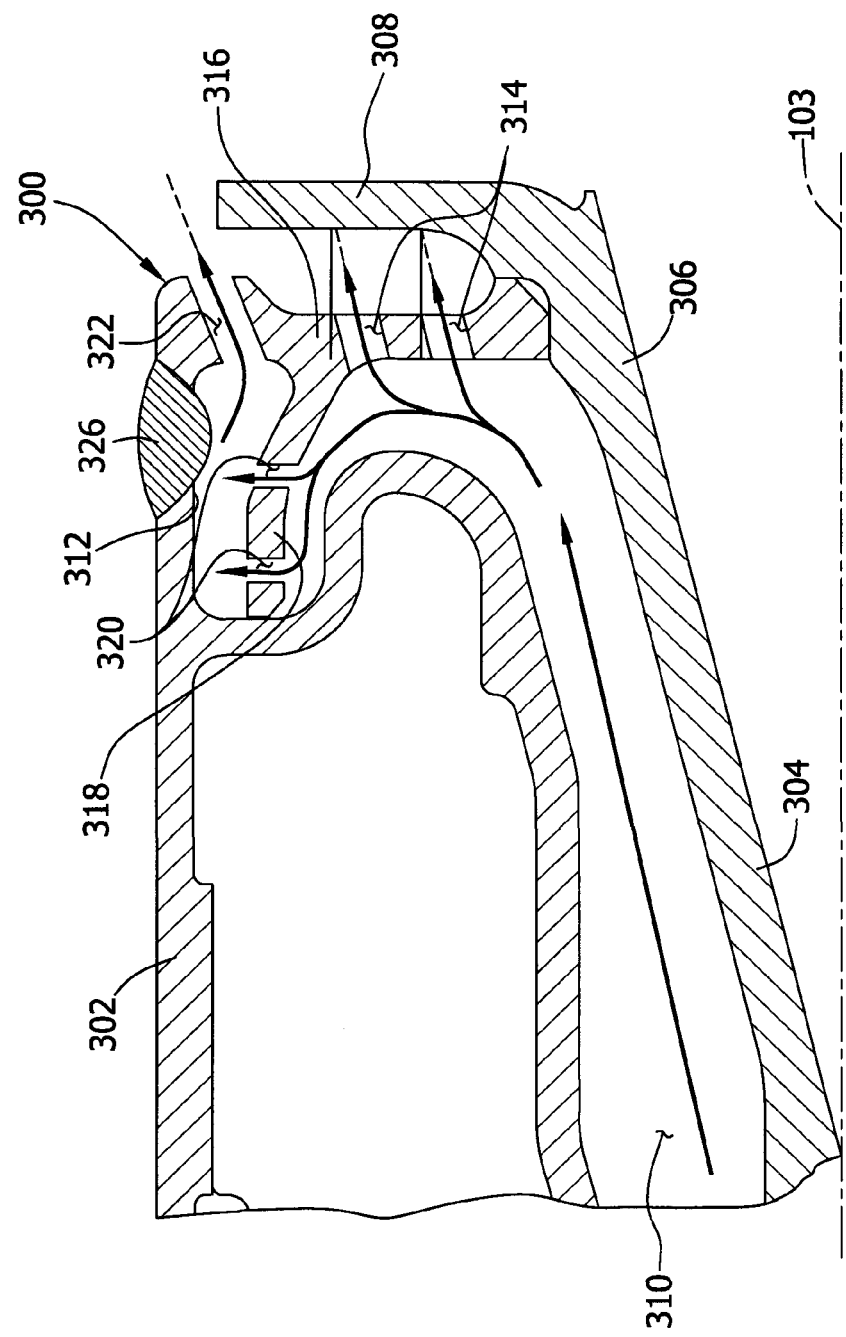
FIG. 8 is a schematic illustration of an alternative centerbody cooling system that may be used with the centerbody shown in FIG. 4.

FIG. 8 is a schematic illustration of an alternative baffle 300 that may be used with the centerbody assembly 102 (shown in FIG. 4). A centerbody outerwall 302 houses a substantially annular member 304 therein. Member 304 extends generally axially outward to an outwardly-diverging outer section 306 that terminates in a radially outwardly extending flange 308. In the illustrated embodiment, air is channeled via an annular conduit 310 to facilitate cooling an inner surface 312 of centerbody outer wall 302 and flange 308. More specifically, a plurality of generally axially-extending cooling air apertures 314 are defined in a baffle end wall 316. In the illustrated embodiment, apertures 314 are sized and oriented to provide a substantially uniform flow field for use in cooling flange 308. Apertures 314 have approximately the same diameter $D_3$, and are circumferentially staggered about end wall 316.

An intermediate flange 318 is radially outward from apertures 314 and extends upstream from baffle end wall 316. In the illustrated embodiment, a plurality of radially-extending air cooling apertures 320 are defined in flange 318. Apertures 320 have approximately the same diameter, and are circumferentially staggered about intermediate flange 318 to provide a substantially uniform flow field for use in cooling centerbody outer wall 302, and more specifically, for cooling inner surface 312.

A plurality of outer cooling apertures 322 are defined in end wall 316. Apertures 322 are sized and oriented to channel air downstream and outwardly. In the illustrated embodiment, apertures 322 are oriented outwardly and rearwardly relative to fuel nozzle assembly axis 103 to provide a plurality of air jets that channel air past flange 308 and towards an innermost portion of a combustion region (not shown). More specifically, apertures 322 are obliquely oriented relative to axis 103 of centerbody assembly 102 at an angle of approximately 45°. Alternatively, apertures 322 may be oriented at an angle of about 40° to about 50° relative to axis 103.

Baffle 300 is coupled to centerbody outer wall 302 at a joint 326. In the exemplary embodiment, joint 326 is a welded joint. Alternatively, baffle 300 is coupled to centerbody outer wall 302 in any configuration that enables combustor to function as described herein.

Figure 9:
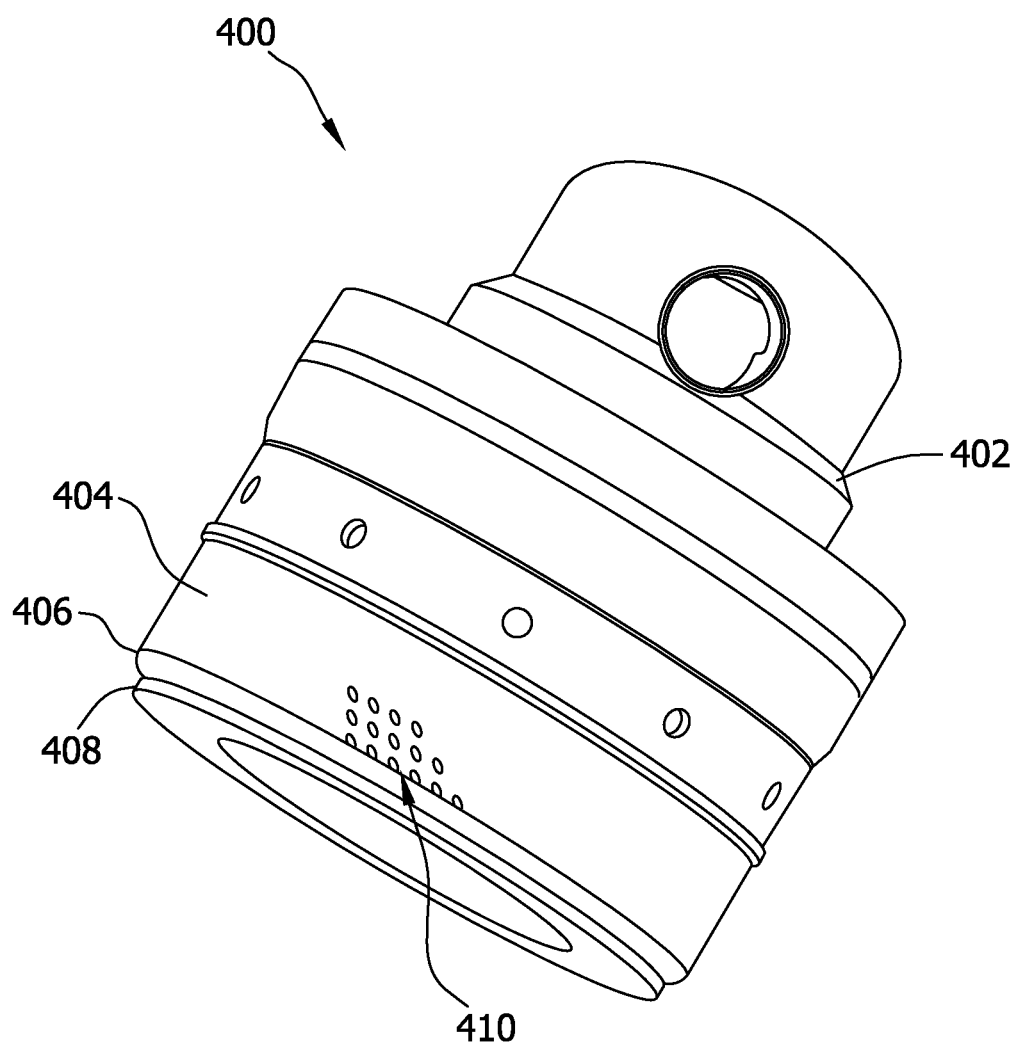
FIG. 9 is a side elevation view of another alternative centerbody cooling system that may be used with the centerbody shown in FIG. 4.

FIG. 9 is a side elevation view of an alternative centerbody cooling system 400 that may be used with a centerbody 402. Centerbody 402 includes an annular outer wall 404 that extends to an end wall 406 and a flange 408. In the exemplary embodiment, centerbody 402 includes an internal impingement cooling system (not shown) as described herein. Alternatively, centerbody 402 does not include the internal impingement cooling system. Centerbody 402 includes a plurality of generally radially-extending cooling air apertures 410 that extend through outer wall 404. In the exemplary embodiment, apertures 410 are sized and oriented to provide a substantially uniform flow field from an internal area of centerbody 402, for example gap 214 (shown in FIG. 5), towards a boundary layer (not shown) that is adjacent to centerbody outer wall 404. More specifically, apertures 410 are generally aligned with the direction of swirl of air flow about the centerbody 402. In the illustrated embodiment, apertures 410 are spaced to facilitate reducing local hot-spots or distressed regions of centerbody outer wall 404 during structural testing. Additionally, the quantity of apertures provided at each location is at least partially based on an amount of airflow within the centerbody 402 (as described herein) as well as local pressure constraints for the selected location on the centerbody outer wall 404. The illustrated embodiment facilitates substantially evacuating any residual fuel or flame that may linger adjacent to centerbody outer wall 404, such that the potential for flashback or auto-ignition is facilitated being substantially reduced.

Figure 10:
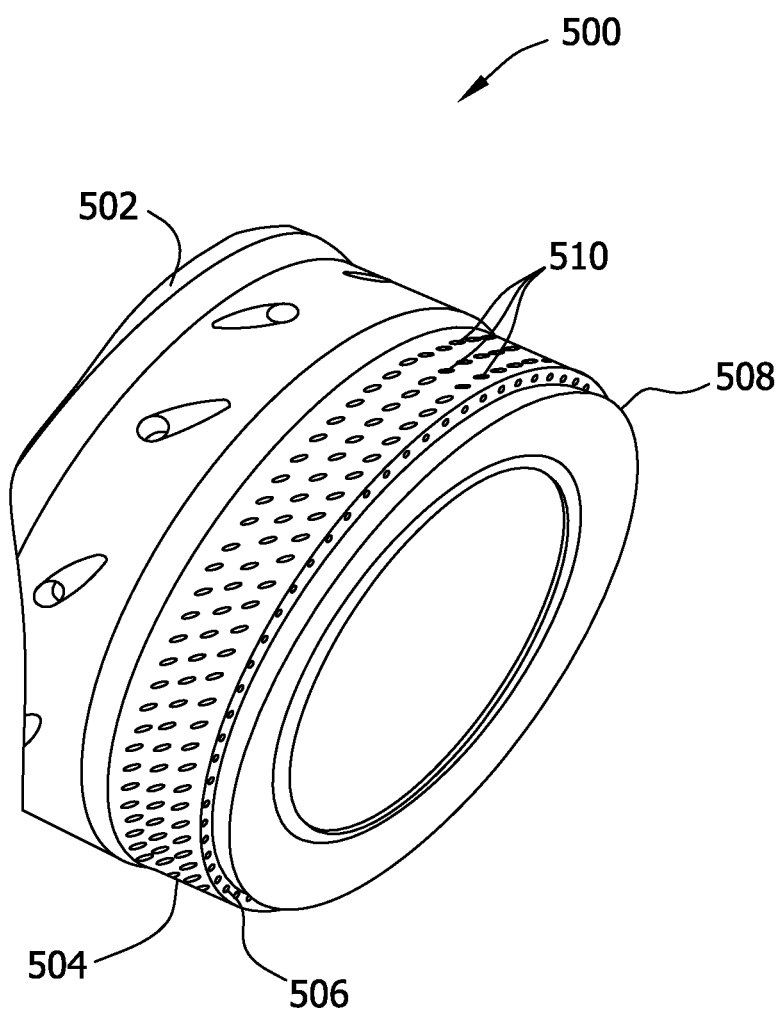
FIG. 10 is a perspective view of a further alternative centerbody cooling system that may be used with the centerbody shown in FIG. 4.

FIG. 10 is a perspective view of an alternative centerbody cooling system 500 that may be used with a centerbody 502. Centerbody 502 includes an annular outer wall 504 that extends to an end wall 506 and a flange 508. In the exemplary embodiment, centerbody 502 includes an internal impingement cooling system (not shown). Alternatively, centerbody 502 does not include the internal impingement cooling system. Centerbody 502 includes a plurality of generally radially-extending cooling air apertures 510 that extend through outer wall 504. In the illustrated embodiment, apertures 510 are sized and oriented to provide a substantially uniform flow field from an internal area of centerbody 502, for example, from gap 214 (shown in FIG. 5), towards to a boundary layer (not shown) adjacent to centerbody outer wall 504. More specifically, in the illustrated embodiment, apertures 510 are generally aligned with the direction of swirl of air flow about centerbody 502. Such a flow pattern provides additional cooling to the centerbody outer wall 504 as well as evacuates any residual fuel or flame that may linger adjacent to centerbody outer wall 504. As such, apertures 510 thereby substantially reduce the potential for flashback or auto-ignition, while providing additional cooling to centerbody outer wall 504.

Exemplary embodiments of centerbody cooling assemblies for use in gas turbine engines are described in detail above. The above-described cooling assemblies use impingement cooling methods to facilitate reducing the operating temperatures of centerbody walls and to facilitate evacuation of residual fuel from the vicinity of the centerbody by channeling a stream of air through apertures oriented and positioned to cool the internal surfaces of the combustor centerbody. Such results are accomplished without disrupting the aerodynamic features of the fuel-mixing system and without creating a substantial pressure change about the centerbody. More specifically, a potential for auto-ignition or flashback exists in turbine engines where air and fuel are pre-mixed. The addition of fuel nozzle centerbodies in known engines increases the risk of auto-ignition, flashback or detonation is increased. Without adequate cooling, there is a potential during an auto-ignition, flashback or detonation event for centerbody walls to over-heat and experience burn-through. The cooling assemblies described herein substantially reduce local heating resulting from a flashback or auto-ignition incident, and reduce centerbody surface temperatures away from these local hot-spots or distressed regions of the centerbody. Such a reduction in temperature substantially reduces the likelihood of flashback or auto-ignition occurrences. Additionally, the cooling assemblies described herein facilitate evacuating fuel from the proximity of the centerbody to further reduce the potential for auto-ignition and flashback.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel nozzle centerbody having a cylindrical cross-sectional area, said centerbody comprising:
   an inlet;
   an outlet;
   a radially outer wall;
   a radially inner wall;
   a centerline axis extending from said inlet to said outlet; and
   a baffle substantially co-axially aligned within said centerbody, said baffle comprising:

a first end portion, an intermediate portion, and a second end portion;

a plurality of circumferentially-spaced apertures configured to channel airflow radially outward to impingement cool said centerbody; and an intermediate support extending radially inward from said intermediate portion of said baffle to contact a mounting flange to facilitate supporting said baffle within said centerbody, said second end portion supported by an end wall flange extending from an end wall of the centerbody, wherein cooling fluid is supplied to the baffle through at least one aperture in said radially inner wall axially between the second end portion and the intermediate support.

2. A fuel nozzle centerbody in accordance with claim 1, wherein said baffle comprises:

the intermediate portion having a first end and an opposite second end, said intermediate portion comprising a first diameter;

the baffle first end portion extending axially from said intermediate portion first end, said baffle first end portion comprising a second diameter, said second diameter greater than said first diameter; and the baffle second end portion extending from said intermediate portion second end, said baffle second end portion comprising a third diameter, said third diameter less than said first diameter and said second diameter.

3. A fuel nozzle centerbody in accordance with claim 1, wherein said plurality of apertures in said baffle further comprise:

at least one row of circumferentially-spaced apertures configured to direct an airflow perpendicular to a centerbody inner surface; and at least one row of circumferentially-spaced apertures configured to direct an airflow obliquely against said centerbody inner surface.

4. A fuel nozzle centerbody in accordance with claim 1, wherein said centerbody end wall comprises a plurality of apertures configured to vent said airflow from within said centerbody.

5. A fuel nozzle assembly in accordance with claim 1, wherein said centerbody outer wall comprises a second plurality of apertures therethrough and configured to channel a second flow of air radially outward from said centerbody.

6. A fuel nozzle assembly in accordance with claim 5, wherein said second plurality of apertures are arranged in at least one grouping positioned on said centerbody outer wall.

7. A fuel nozzle assembly in accordance with claim 5, wherein said second plurality of apertures are circumferentially-spaced about said centerbody outer wall.

8. A gas turbine engine comprising:

a fuel nozzle centerbody including a cylindrical cross-section, said centerbody comprising a radially inner wall, a radially outer wall, and a plurality of apertures through the centerbody outer wall, said plurality of apertures configured to channel a flow of air radially outward from said centerbody; and a baffle comprising a first end portion, an intermediate portion, a second end portion, and a plurality of circumferentially-spaced apertures configured to channel airflow radially outward to impingement cool said centerbody, said baffle co-axially aligned within said centerbody and comprising an intermediate support extending radially inward from said intermediate portion of said baffle to contact a mounting flange to facilitate supporting said baffle within said centerbody, said second end portion supported by an end wall flange extending from an end wall of the centerbody, wherein cooling fluid is supplied to the baffle through at least one aperture in said radially inner wall axially between the second end portion and the intermediate support.

9. A gas turbine engine in accordance with claim 8, wherein said plurality of apertures through said centerbody outer wall are oriented such that said airflow is aligned with a swirl direction surrounding said centerbody.

10. A gas turbine engine in accordance with claim 9, wherein said plurality of apertures through said centerbody outer wall are arranged in at least one grouping positioned on said centerbody outer wall.

11. A gas turbine engine in accordance with claim 9, wherein said plurality of apertures through said centerbody outer wall are circumferentially-spaced about said centerbody outer wall.

12. A gas turbine engine in accordance with claim 8, wherein said plurality of circumferentially-spaced apertures in said baffle are configured to channel an airflow radially outward such that said channeled airflow impinges a centerbody inner surface.

13. A gas turbine engine in accordance with claim 12, wherein said baffle further comprises:

the intermediate portion having a first end and an opposite second end, said intermediate portion comprising a first diameter;

the baffle first end portion extending axially from said intermediate portion first end, said baffle first end portion comprising a second diameter, said second diameter greater than said first diameter; and the baffle second end portion extending from said intermediate portion second end, said baffle second end portion comprising a third diameter, said third diameter less than said first diameter and said second diameter.

14. A gas turbine engine in accordance with claim 12, wherein said plurality of baffle apertures further comprises:

at least one row of circumferentially-spaced apertures configured to direct an airflow perpendicular to said centerbody inner surface; and at least one row of circumferentially-spaced apertures configured to direct an airflow obliquely against said centerbody inner surface.

* * * * *